(12) United States Patent
Yamamoto

(10) Patent No.: US 8,505,646 B2
(45) Date of Patent: Aug. 13, 2013

(54) CAB AND MOTOR GRADER

(75) Inventor: Yasuko Yamamoto, Hitachinaka (JP)

(73) Assignee: Komatsu Ltd., Tokyo (JP)

( * ) Notice: Subject to any disclaimer, the term of this patent is extended or adjusted under 35 U.S.C. 154(b) by 0 days.

(21) Appl. No.: 13/822,647

(22) PCT Filed: May 24, 2012

(86) PCT No.: PCT/JP2012/063284
§ 371 (c)(1),
(2), (4) Date: Mar. 13, 2013

(87) PCT Pub. No.: WO2012/165279
PCT Pub. Date: Dec. 6, 2012

(65) Prior Publication Data
US 2013/0168116 A1 Jul. 4, 2013

(30) Foreign Application Priority Data

May 31, 2011 (JP) .................................. 2011-122258

(51) Int. Cl.
*E02F 3/00* (2006.01)
*B60K 26/00* (2006.01)

(52) U.S. Cl.
USPC .............................. 172/781; 180/334; 74/493

(58) Field of Classification Search
USPC ............... 172/2–11, 669, 780, 781; 180/326, 180/334, 324, 333, 78; 280/775, 779; 123/365, 123/198 D, 397, 43, 337, 584; 74/482, 470, 74/514, 560, 493
See application file for complete search history.

(56) References Cited

U.S. PATENT DOCUMENTS

| 4,325,266 | A | * | 4/1982 | Lynch .............................. 74/482 |
| 4,580,647 | A | * | 4/1986 | Peifer et al. ..................... 180/78 |
| 5,632,353 | A | * | 5/1997 | Kimberley .................... 180/326 |
| 6,023,995 | A | * | 2/2000 | Riggle ............................ 74/560 |
| 6,058,916 | A | * | 5/2000 | Ozawa ....................... 123/559.3 |
| 6,854,523 | B2 | * | 2/2005 | Takahashi ....................... 172/3 |
| 7,458,439 | B2 | * | 12/2008 | Catton et al. .................. 180/334 |
| 7,549,498 | B2 | * | 6/2009 | Lunzman et al. ............. 180/242 |
| 8,333,250 | B2 | * | 12/2012 | Knepper et al. .............. 172/781 |

FOREIGN PATENT DOCUMENTS

| JP | 63-56756 U | 4/1988 |
| JP | 6-1462 U | 1/1994 |
| JP | 11-158923 A | 6/1999 |

OTHER PUBLICATIONS

International Search Report for PCT/JP2012/063284.

* cited by examiner

*Primary Examiner* — Robert Pezzuto
(74) *Attorney, Agent, or Firm* — Global IP Counselors, LLP

(57) ABSTRACT

A cab includes a floor panel, an operator's seat, a handle post, an operating lever and a pedal. The operating lever includes a rod, a lower link member, an upper link member and a handle. The rod has a rod lower end portion, a rod upper end portion and a bent portion connected to the rod lower end portion and the rod upper end portion. The bent portion is formed in a forwardly convex shape. The pedal has a placement surface on which a foot of an operator is placed. A straight line passing along the placement surface in a side view intersecting with the bending point, when the pedal is located in any position within a pivot range.

4 Claims, 6 Drawing Sheets

CAB AND MOTOR GRADER

CROSS-REFERENCE TO RELATED APPLICATIONS

This application claims priority to Japanese Patent Application No. 2011-122258 filed on May 31, 2011, the disclosure of which is hereby incorporated herein by reference in its entirety.

BACKGROUND

The present invention relates to a cab equipped with an operating lever and a motor grader.

TECHNICAL FIELD

In general, motor graders include an operator's seat, a handle post disposed in front of the operator's seat, an operating lever disposed upright laterally to the handle post and a pedal disposed between the operating lever and the operator's seat (e.g., see Japanese Laid-open Patent Application Publication H11-158923).

SUMMARY

However, when an operator presses down the pedal with one's foot, the toe of the foot may interfere with the operating lever, and thereby, the operating lever may be erroneously operated.

The present invention has been produced in view of the above situation, and aims at providing a cab and a motor grader whereby an erroneous operation of an operating lever can be inhibited.

A cab according to a first aspect of the present invention includes: a floor panel; an operator's seat disposed on the floor panel; a handle post disposed forwards of the operator's seat; an operating lever disposed upright on the floor panel and being disposed laterally to the handle post; and a pedal that is disposed on the floor panel and being disposed between the operating lever and the operator's seat, and is pivotable up and down. The operating lever includes: a rod having a rod lower end portion provided with a first shaft, a rod upper end portion provided with a second shaft parallel to the first shaft, and a bent portion that has a bending point positioned forwards of the rod lower end portion, is connected to the rod lower end portion and the rod upper end portion and is formed in a forwardly convex shape; a lower link member that is coupled to the first shaft, is positioned rearwards of the first shaft and is pivotable up and down about a third shaft parallel to the first shaft; an upper link member that is coupled to the second shaft, is positioned rearwards of the second shaft and is pivotable up and down about a fourth shaft parallel to the first shaft; and a handle coupled to the upper link member at the fourth shaft. The pedal has a placement surface on which a foot of an operator is placed. A straight line passing along the placement surface in a side view intersects with the bending point where the pedal is located in any position within a pivot range.

According to the cab of the first aspect of the present invention, the bending point is positioned forwards of the first shaft. Therefore, the rod can be forwardly separated away from the pedal. Further, the straight line passing along the placement surface intersects with the bending point where the pedal is located in any position within the pivot range. Therefore, the rod can be further forwardly separated away from the pedal compared to the case that the straight line does not intersect with the bending point due to the bending point disposed further downwards. It is thus possible to inhibit the toe of an operator's foot placed on the pedal from interfering with the operating lever. Accordingly, the operating lever can be inhibited from being erroneously operated. Further, the center of gravity can be forwardly shifted compared to the case that the rod is formed in a linear shape. The handle can be thereby operated with a light operational feeling.

A cab according to a second aspect of the present invention relates to the first aspect, and wherein the straight line passing along the placement surface in a side view intersects with the bending point where the pedal is located in a lower end position within the pivot range.

According to the cab of the second aspect of the present invention, it is possible to inhibit interference between the toe of an operator's foot and the operating lever where the toe of the operator's foot placed on the pedal is protruded to the foremost position. Therefore, the operating lever can be further inhibited from being erroneously operated.

A cab according to a third aspect of the present invention relates to the first aspect or the second aspect, and wherein a straight line connecting the bending point and the second shaft is arranged in parallel to a straight line connecting the third shaft and the fourth shaft, while a straight line connecting the first shaft and the third shaft is arranged in parallel to a straight line connecting the second shaft and the fourth shaft.

According to the cab of the third aspect of the present invention, the operating lever forms a parallel link mechanism, and therefore, force to be inputted into the handle can be efficiently transmitted to the lower link member.

According to the present invention, it is possible to provide a motor grader whereby an erroneous operation of an operating lever can be inhibited.

DETAILED DESCRIPTION OF EMBODIMENTS

Overall Structure of Motor Grader 100

Figure 1:
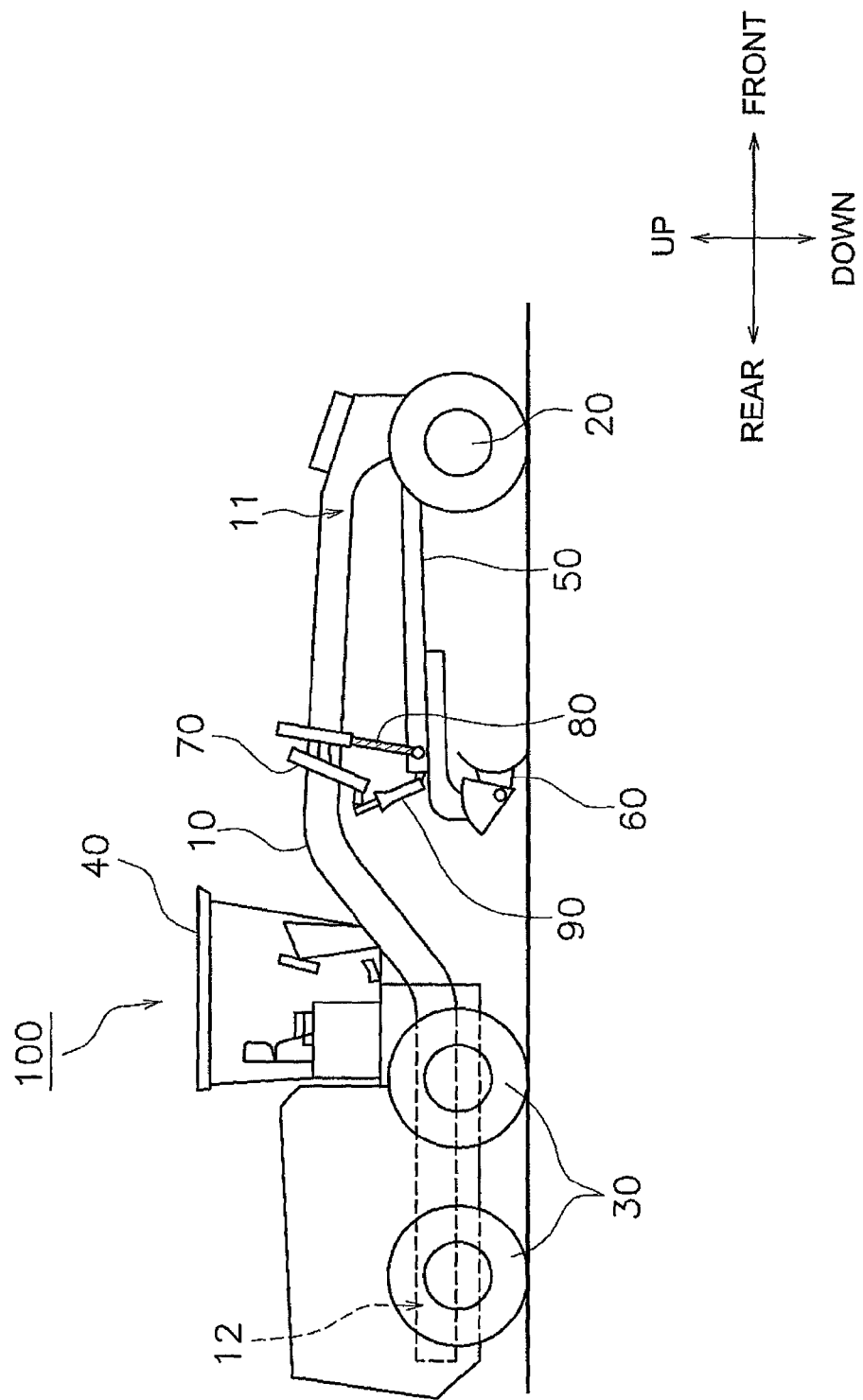
FIG. 1 is a side view of an entire structure of a motor grader.

FIG. 1 is a side view of the entire structure of a motor grader 100 according to an exemplary embodiment. It should be noted in the following explanation that "up", "down", "left", "right", "front" and "rear" are terms based on an operator seated on an operator's seat.

As illustrated in FIG. 1, the motor grader 100 includes a frame 10, a front wheel 20, a rear wheel 30, a cap 40, a drawbar 50, a working unit 60, a lifter guide 70, a pair of lift cylinders 80 and a shift cylinder 90.

The frame 10 is formed by a front frame 11 and a rear frame 12. The front frame 11 supports the drawbar 50 and the working unit 60. The rear frame 12 supports an engine, a hydraulic pump and etc., which are not illustrated in the figures. The front wheel 20 is attached to the front end portion of the frame 10. The rear wheel 30 is attached to the rear end portion of the frame 10. In the present exemplary embodiment, the front wheel 20 includes a pair of right and left travelling wheels, while the rear wheel 30 includes two pairs of right and left travelling wheels. However, the present invention is not limited to the configuration. The cab 40 is disposed on the frame 10. The internal structure of the cab 40 will be described below.

The drawbar 50 is attached to the front end portion of the frame 10 while being pivotable up and down. The working unit 60 is fixed to the rear end portion of the drawbar 50. The lifter guide 70 is an annular member fixed to the frame 10. The lift cylinders 80 of the pair (only the right lift cylinder is illustrated in FIG. 1) are coupled to the drawbar 50 and the lifter guide 70. The working unit 60 is moved up and down in conjunction with extension and contraction of the lift cylinders 80 of the pair. The shift cylinder 90 is coupled to the drawbar 50 and the lifter guide 70. The drawbar 60 is transversely moved in conjunction with extension and the contraction of the shift cylinder 90.

Internal Structure of Cab 40

Figure 2:
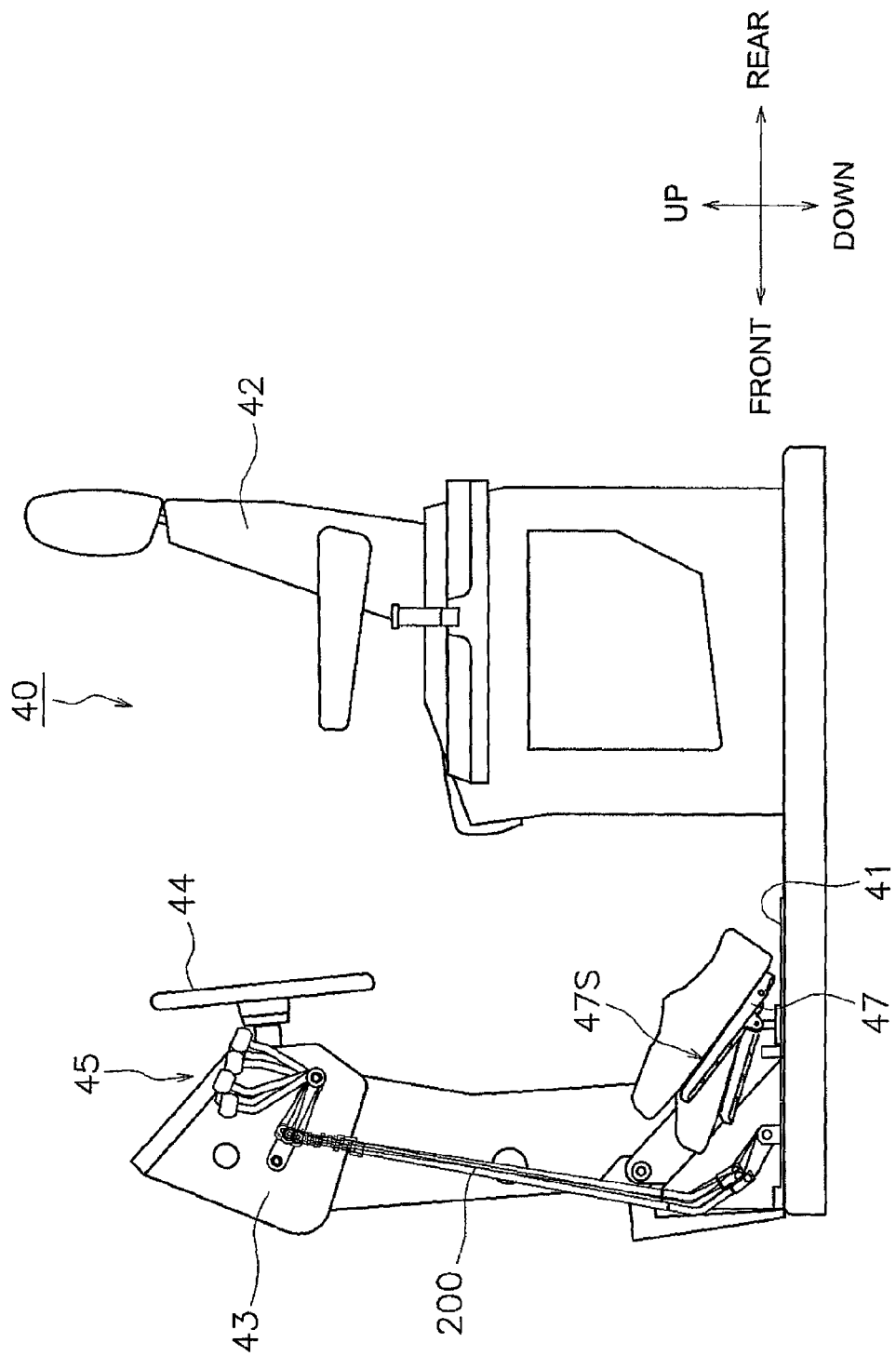
FIG. 2 is a side view of an internal structure of a cab.
Figure 3:
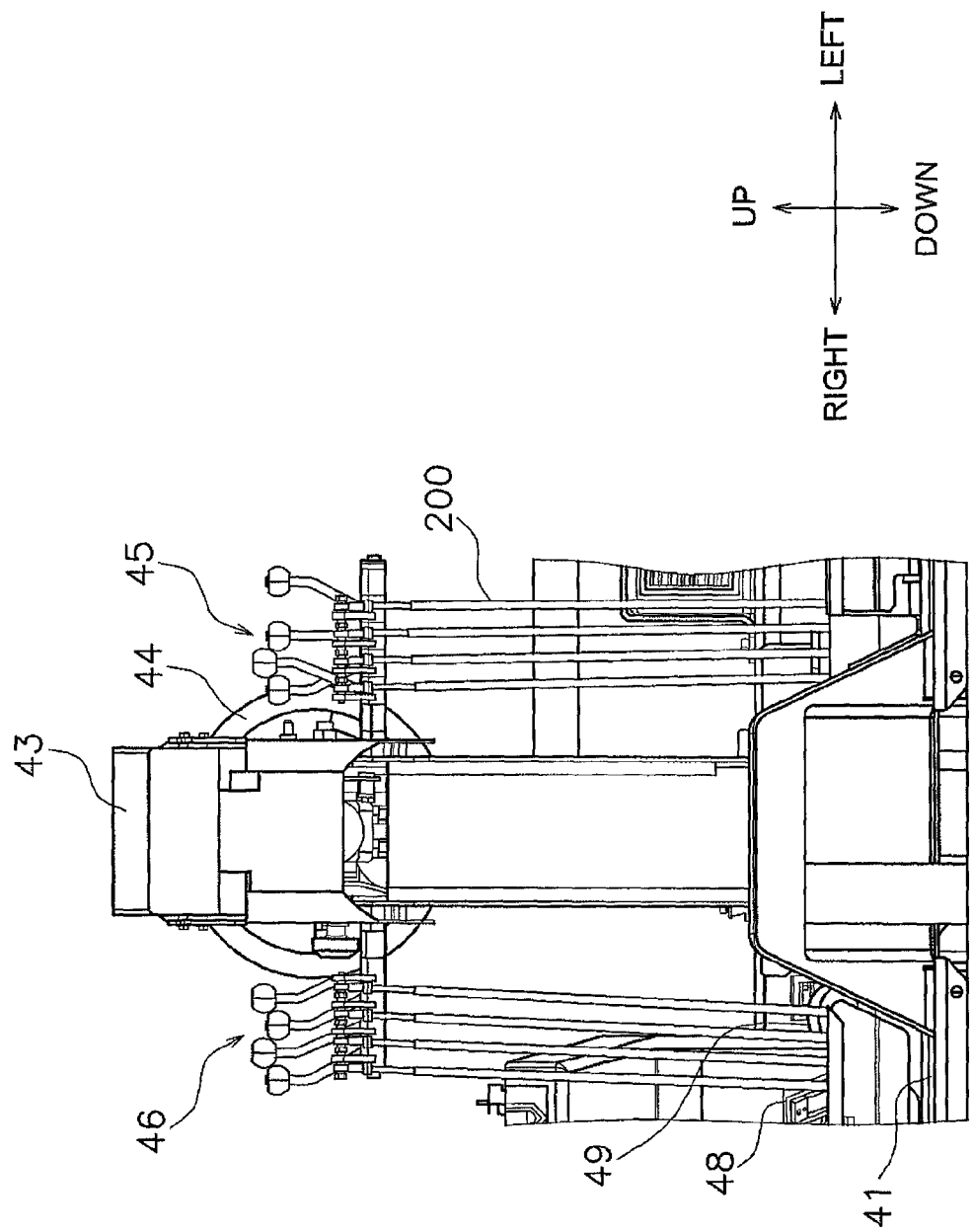
FIG. 3 is a front view of the internal structure of the cab.

FIG. 2 is a side view of the internal structure of the cab 40 according to the exemplary embodiment. FIG. 3 is a front view of the internal structure of the cab 40 of the exemplary embodiment.

As illustrated in FIGS. 2 and 3, inside the cab 40, the motor grader 100 includes a floor panel 41, an operator's seat 42, a handle post 43, a handle 44, a left operating lever group 45, a right operating lever group 46, an inching pedal 47, an accelerator pedal 48 and a brake pedal 49.

The floor panel 41 is formed by a plate-shaped member. The operator's seat 42 is disposed on the floor panel 41 while being oriented forwards. The handle post 43 is disposed in front of the operator's seat 42. The handle 44 is attached to the handle post 43 while being faced to the operator's seat 42.

The left operating lever group 45 is formed by a plurality of operating levers such as a blade rotary lever and a shift cylinder operating lever other than a left cylinder operating lever 200. The right operating lever group 46 is formed by a plurality of operating levers such as a right lift cylinder operating lever, a leaning operation lever. The respective operating levers, included in the left operating lever group 45 and the right operating lever group 46, are supported by the handle post 43 on the lateral sides of the handle post 43, while being disposed upright with respect to the floor panel 41. The structures of the respective operating levers will be described below by exemplifying the left lift cylinder operating lever 200.

The inching pedal 47 is an operating tool to be pressed down by an operator's foot for reducing the vehicle speed by producing slippage in the clutch. The inching pedal 47 is disposed on the floor panel 41 while being disposed between the left operating lever group 45 and the operator's seat 42. The inching pedal 47 is pivotable up and down about a shaft 47p (see FIGS. 4 and 5) provided in the rear end portion thereof. When pressed down by the operator's foot, the inching pedal 47 is moved between an upper end position (a solid line in FIG. 2) and a lower end position (a dashed line in FIG. 2). As illustrated in FIG. 2, the inching pedal 47 has a placement surface 47S on which the operator's foot is placed.

The accelerator pedal 48 is an operating tool to be pressed down by an operator's foot for regulating the engine speed to be a desired engine speed. The brake pedal 49 is an operating tool to be pressed down by an operator's foot for reducing rotation of the rear wheel 30. The accelerator pedal 48 and the brake pedal 49 are disposed on the floor panel 41 while being disposed between the right operating lever group 46 and the operator's seat 42.

Similarly to the inching pedal 47, each of the accelerator pedal 48 and the brake pedal 49 is pivotable up and down about a shaft disposed in the rear end portion thereof.

Here, the handle post 43 is provided while being rotatable back and forth about a shaft disposed at the bottom end thereof in parallel to the vehicle transverse direction. The left operating lever group 45 and the right operating lever group 46 are supported by the handle post 43, and are thereby rotated back and forth together with the handle post 43 about a first shaft p1 (see FIG. 5) to be described.

Figure 4:
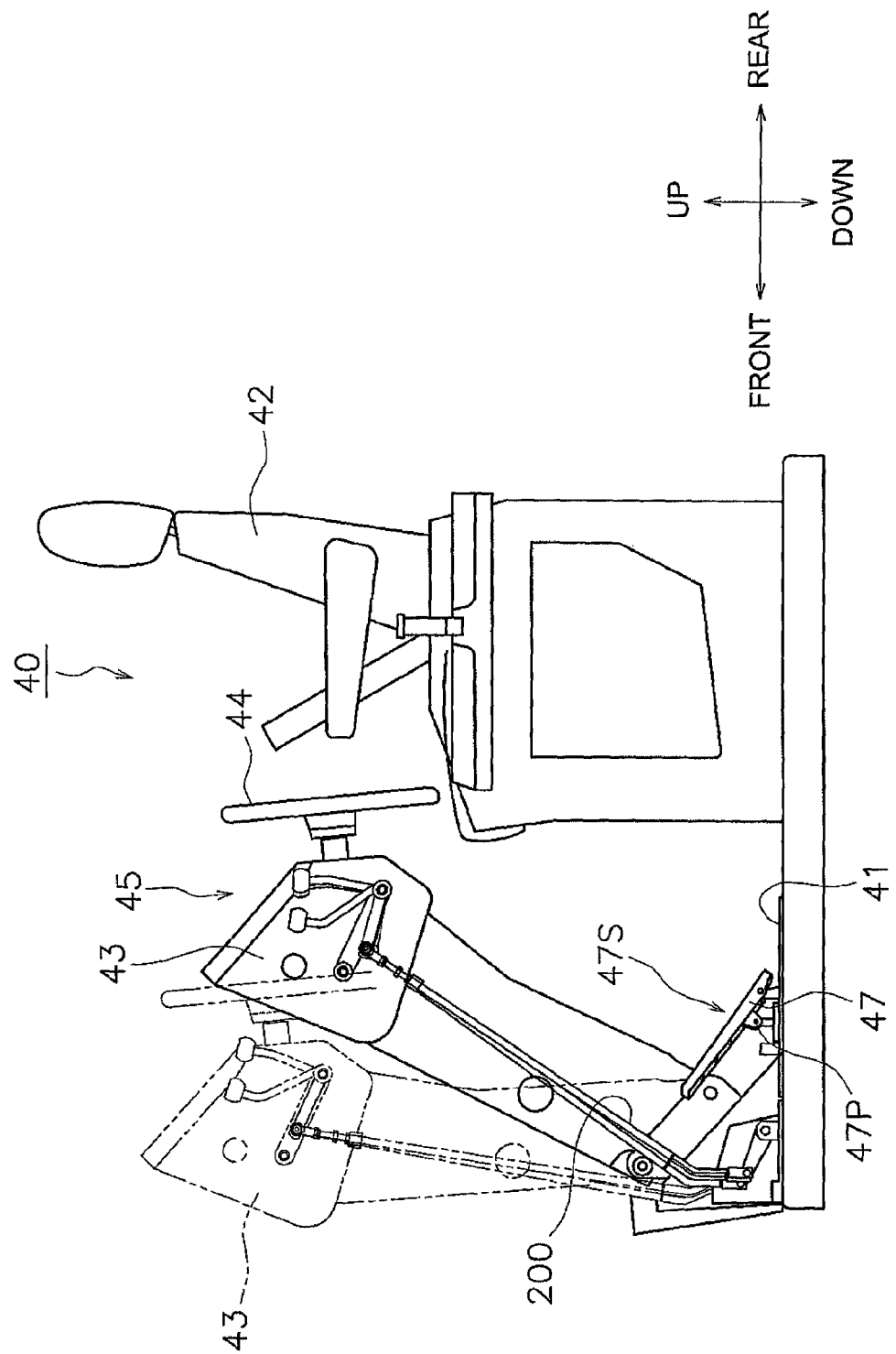
FIG. 4 is a diagram for explaining a range of motion of a handle post and a left operating lever group.

FIG. 4 is a diagram for explaining a range of motion of the handle post 43 and that of the left operating lever group 45. In driving, an operator sets the handle post 43 to be in a desired position between a rear end position (a solid line in FIG. 4) and a front end position (a dashed line in FIG. 4). Further, an operator sets the handle post 43 to be in the front end position when getting on or off the operator's seat 42. Thus, the positions of the handle 44, the left operating lever group 45 and the right operating lever group 46 are configured to be appropriately changeable in accordance with an operator's physique, and simultaneously, getting-on/off performance of an operator is configured to be reliably achieved.

Structure of Operating Lever

Figure 5:
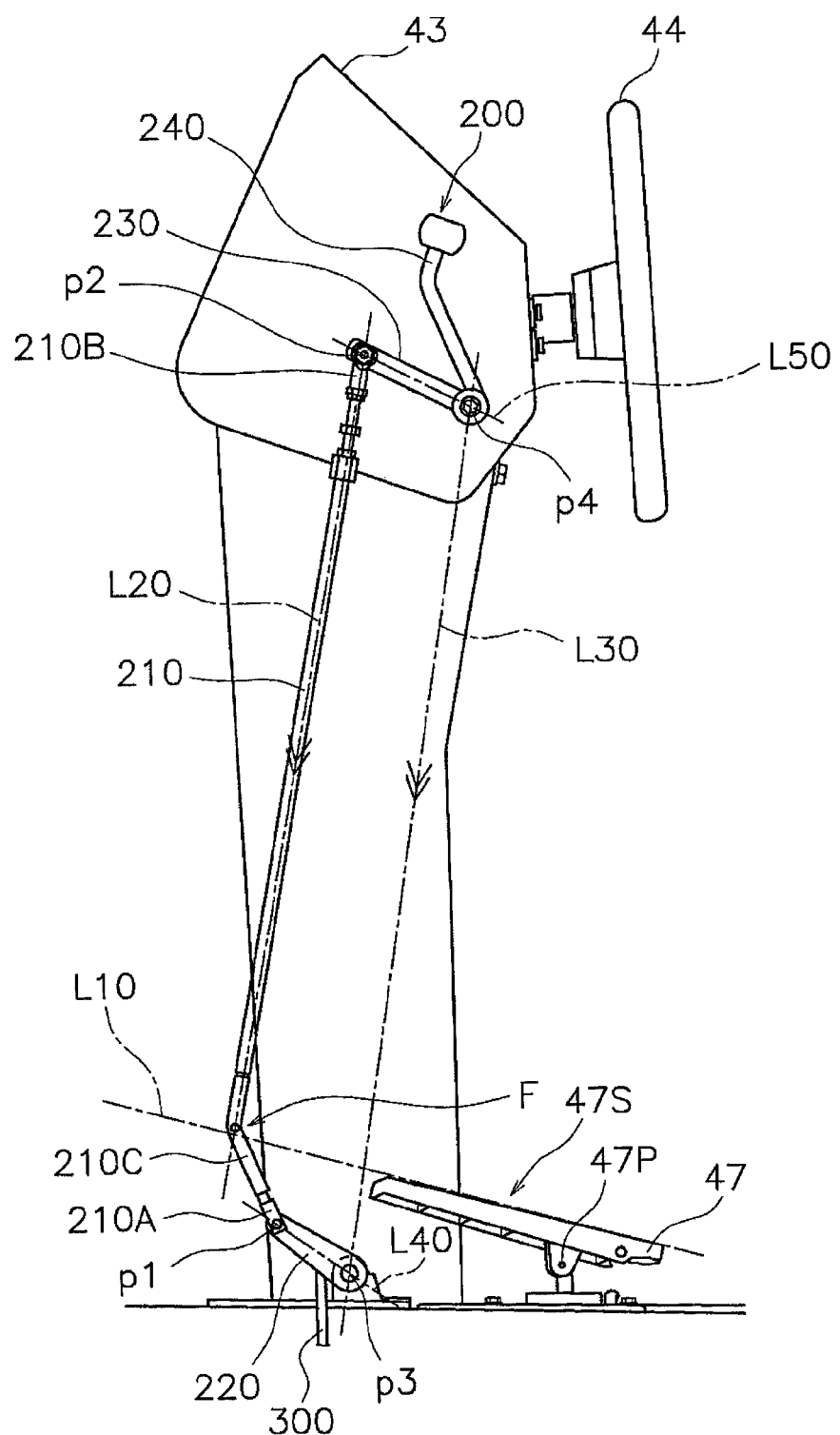
FIG. 5 is a side view of a structure of a left lift cylinder operating lever.

Next, the structures of the operating levers according to the exemplary embodiment will be explained by exemplifying the structure of the left lift cylinder operating lever 200. FIG. 5 is a side view of the structure of the left lift cylinder operating lever 200. It should be noted that FIG. 5 illustrates the inching pedal 47 located in the lower end position (see the dashed line in FIG. 2).

(1) Members Forming Operating Lever

As illustrated in FIG. 5, the left lift cylinder operating lever 200 includes a rod 210, a lower link member 220, an upper link member 230 and a handle 240.

The rod 210 has a rod lower end portion 210A, a rod upper end portion 210B and a bent portion 210C. The rod lower end portion 210A is provided with the first shaft p1 disposed along a predetermined direction (the vehicle transverse direction in the present exemplary embodiment). The rod upper end portion 210B is provided with a second shaft p2 parallel to the first shaft p1. The bent portion 210C is connected to the rod lower end portion 210A and the rod upper end portion 210B. The bent portion 210C has a bending point F and is bent for having a forwardly convex shape.

As illustrated in FIG. 5, in the present exemplary embodiment, the bending point F is herein positioned forwards of the first shaft p1 provided in the rod lower end portion 210A. In other words, the rod 210 is bent in a position forward of the first shaft p1. Therefore, the rod 210 is extended forwards and obliquely upwards from the first shaft p1 and is then extended rearwards and obliquely upwards.

The lower link member 220 is coupled to the first shaft p1 while being coupled to a third shaft p3. The third shaft p3 is positioned rearwards of and lower than the first shaft p1. Further, the third shaft p3 is disposed in parallel to the first shaft p1. The lower link member 220 is rotatable up and down about the third shaft p3. Further, a valve directly connected member 300, directly connected to a left lift cylinder hydraulic valve (not illustrated in the figures), is connected to the lower link member 220.

The upper link member 230 is coupled to the second shaft p2, while being coupled to a fourth shaft p4. The fourth shaft p4 is positioned rearwards of and lower than the second shaft p2. Further, the fourth shaft p4 is disposed in parallel to the first shaft p1. The upper link member 230 is rotatable up and down about the fourth shaft p4.

The handle 240 is coupled to the upper link member 230 at the fourth shaft p4. The handle 240 is rotatable back and forth about the fourth shaft p4.

When an operator rotates the handle 240 back and forth, the upper link member 230 is rotated up and down about the fourth shaft p4, and in conjunction, the lower link member 220 is rotated up and down about the third shaft p3. As a result, the hydraulic valve (left lift cylinder) is controlled in conjunction with the up-and-down move of the valve directly connected member 300.

(2) Reference Lines

1. Reference Line L10

A reference line L10 is a straight line that passes along the placement surface 47S of the inching pedal 47 in a side view when the inching pedal 47 is located in the lower end position. As illustrated in FIG. 5, the reference line L10 intersects with the bending point F included in the bent portion 210C of the rod 210.

It should be noted that the left lift cylinder operating lever 200 is tilted back and forth together with the handle post 43 as described above, whereas the reference line L10 intersects with the bending point F over the entire moving range of the left lift cylinder operating lever 200.

2. Reference Line L20 and Reference Line L30

A reference line L20 is a straight line connecting the bending point F and the second shaft p2. A reference line L30 is a straight line connecting the third shaft p3 and the fourth shaft p4. The reference line L20 is disposed in parallel to the reference line L30.

3. Reference Line L40 and Reference Line L50

A reference lien L40 is a straight line connecting the first shaft p1 and the third shaft p3. A reference line L50 is a straight line connecting the second shaft p2 and the fourth shaft p4. The reference line L40 is disposed in parallel to the reference line L50.

Action and Effects (1) In the motor grader 1 according to the exemplary embodiment, the bending point F, included in the bent portion 210C, is positioned forwards of the first shaft p1 disposed in the rod lower end portion 210A.

Therefore, the rod 210 can be forwardly separated away from the inching pedal 47. Therefore, the toe of an operator's foot placed on the inching pedal 47 can be inhibited from interfering with the left lift cylinder operating lever 200 (an exemplary "operating lever"). Thus, the left lift cylinder operating lever 200 can be inhibited from being erroneously operated. Further, the center of gravity can be forwardly shifted compared to the case that the rod 210 is formed in a linear shape. Therefore, the handle 240 can be operated with a light operational feeling.

(2) The reference line L10, passing along the placement surface 47S in a side view, intersects with the bending point F where the inching pedal 47 is located in the lower end position Therefore, even when the toe of an operator's foot placed on the inching pedal 47 is protruded to the foremost position, it is possible to inhibit interference between the operator's toe and the left lift cylinder operating lever 200. The left lift cylinder operating lever 200 can be thereby further inhibited from being erroneously operated.

(3) The reference line L20 connecting the bending point F and the second shaft p2 is arranged in parallel to the reference line L30 connecting the third shaft p3 and the fourth shaft p4. The reference line LAO connecting the first shaft p1 and the third shaft p3 is arranged in parallel to the reference line L50 connecting the second shaft p2 and the fourth shaft p4.

Thus, the left lift cylinder operating lever 200 forms a parallel link mechanism, and therefore, force to be inputted into the handle 240 can be efficiently transmitted to the lower link member 220.

Figure 6:
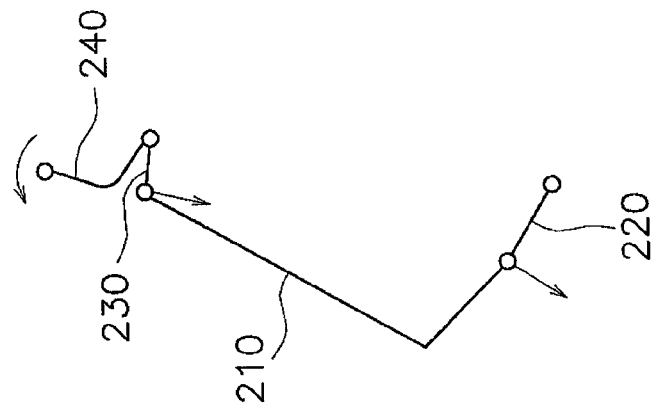
FIG. 6A is a diagram for explaining transmission of force in a link mechanism.
FIG. 6B is a diagram for explaining transmission of force in the link mechanism.
Figure 6:
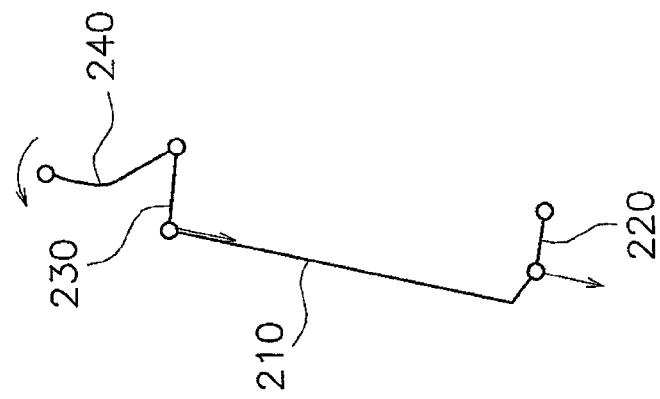

Specifically, in a link mechanism as illustrated in FIG. 6A, the rotary direction of the upper link member 230 and that of the lower link member 220 cannot be aligned. By contrast, in a parallel link mechanism as illustrated in FIG. 6B, the rotary direction of the upper link member 230 and that of the lower link member 220 can be aligned.

Other Embodiments

An exemplary embodiment of the present invention has been explained above. However, the present invention is not limited to the aforementioned exemplary embodiment, and a variety of changes can be herein made without departing from the scope of the present invention.

(A) In the aforementioned exemplary embodiment, the reference line L10 is set to intersect with the bending point F. However, the present invention is not limited to this. The reference line L10 is only required to intersect with the left lift cylinder operating lever 200 in the vicinity of the bending point F, and technically, may not intersect with the bending point F (B) In the aforementioned exemplary embodiment, the left lift cylinder operating lever 200 is structured to form the parallel link mechanism. However, the present invention is not limited to this. The left lift cylinder operating lever 200 can be inhibited from being erroneously operated even when being a link mechanism as illustrated in FIG. 6A.

(C) In the aforementioned exemplary embodiment, the left lift cylinder operating lever 200 has been explained as an exemplary operating lever. However, the aforementioned link mechanism is applicable to any of the operating levers included in the left operating lever group 45 and the right operating lever group 46. It should be noted that when the link mechanism is applied to an operating lever included in the right operating lever group 46, it is possible to inhibit interference with a foot placed on either the accelerator pedal 48 or the brake pedal 49.

What is claimed is:
1. A cab comprising:
a floor panel;
an operator's seat disposed on the floor panel;
a handle post disposed forwards of the operator's seat;
an operating lever disposed upright on the floor panel and disposed laterally to the handle post; and
a pedal disposed on the floor panel and disposed between the operating lever and the operator's seat, the pedal being pivotable up and down, the operating lever including a rod, a lower link member, an upper link member and a handle, the rod having a rod lower end portion, a rod upper end portion and a bent portion, the rod lower end portion being provided with a first shaft, the rod upper end portion being provided with a second shaft parallel to the first shaft, the bent portion having a bending point positioned forwards of the rod lower end portion, the bent portion being connected to the rod lower end portion and the rod upper end portion, the bent portion being formed in a forwardly convex shape, the lower link member being coupled to the first shaft, the lower link member being positioned rearwards of the first shaft, the lower link member being pivotable up and down about a third shaft parallel to the first shaft, the upper link member being coupled to the second shaft, the upper link member being positioned rearwards of the second shaft, the upper link member being pivotable up and down about a fourth shaft parallel to the first shaft, and the handle being coupled to the upper link member at the fourth shaft, the pedal having a placement surface on which a foot of an operator is placed, and a straight line passing along the placement surface in a side view intersecting with the bending point, when the pedal is located in any position within a pivot range.

2. The cab according to claim 1, wherein the straight line passing along the placement surface intersects with the bending point, when the pedal is located in a lower end position within the pivot range.

3. The cab according to claim 1, wherein a straight line connecting the bending point and the second shaft is arranged in parallel to a straight line connecting the third shaft and the fourth shaft, and a straight line connecting the first shaft and the third shaft is arranged in parallel to a straight line connecting the second shaft and the fourth shaft.

4. A motor grader comprising:

the cab according to claim 1;

a frame supporting the cab; and a tire and a working unit attached to the frame.

* * * * *